United States Patent Office 3,833,661
Patented Sept. 3, 1974

3,833,661
NOVEL PROCESS FOR THE PREPARATION OF TRIS(HYDROXYMETHYL)PHOSPHINE AND TRIS(HYDROXYMETHYL)PHOSPHINE OXIDE
Samuel E. Ellzey, Jr., and William J. Connick, Jr., New Orleans, La., assignors to the United States of America as represented by the Secretary of Agriculture
No Drawing. Filed July 18, 1972, Ser. No. 272,812
Int. Cl. C07f 9/02
U.S. Cl. 260—606.5 P    3 Claims

ABSTRACT OF THE DISCLOSURE

Tris(hydroxymethyl)phosphine was prepared from tetrakis(hydroxymethyl)phosphonium salts by interaction with one equivalent of a strongly basic anion exchange resin in the hydroxide form. The corresponding phosphine oxide resulted from interaction of the phosphonium salts with an excess of the basic ion exchange resin.

---

A non-exclusive, irrevocable, royalty-free license in the invention herein described, throughout the world for all purposes of the United States Government with the power to grant sublicenses for such purposes, is hereby granted to the Government of the United States of America.

This invention provides a method for the preparation of substantially pure tris(hydroxymethyl)phosphine (THP), $(HOCH_2)_3P$, and tris(hydroxymethyl)phosphine oxide (THPO), $(HOCH_2)_3PO$.

THP has been prepared previously by reaction of phosphine ($PH_3$) with formaldehyde in the presence of heavy-metal catalysts (M. Reuter and L. Orthner, Ger. Pat. 1,035,135, issued July 31, 1958). This method suffers from the fact that the expensive heavy-metal catalysts are difficult to recover and cannot be recovered unchanged from the reaction mixture. We have also observed that the product THP prepared in this manner is more unstable during storage than that prepared by other routes from, for instance, tetrakis(hydroxymethyl)phosphonium chloride (THPC), $(HOCH_2)_4P^+Cl^-$. Reaction of phosphine with aqueous formaldehyde under pressure in the absence of a metal catalyst has also been used to prepare THP (R. H. Carlson, Abstracts of Papers, 162nd. ACS Meeting, Washington, D.C., Sept. 13–17, 1971). THP has also been prepared by reaction of THPC with various bases, such as one equivalent of an alkali metal hydroxide (M. Grayson, Ger. Pat. 1,151,255, issued July 11, 1963) or an excess of a tertiary amine (such as triethylamine) [K. A. Petrov, V. A. Parshina, and M. B. Luzanova, Zh. Obshch. Khim., 32, 553 (1962); Chem. Abstr., 58, 5714 (1963)]. In the process utilizing an alkali metal hydroxide in water as solvent, the byproduct alkali metal chloride must be removed by first evaporating the aqueous solution until the water is removed, and then extracting the water-soluble THP from the salt by the use of a suitable solvent. The process may also be carried out in a solvent in which the product THP is soluble and the byproduct salt is relatively insoluble. Complete removal of the salt contaminant may present problems because of partial solubility in the solvent used, and solvents more expensive than water are required. In the process in which a tertiary amine is used as the base, there is formed as a byproduct one equivalent of the hydrochloride of the amine, which can be difficult to remove from its mixture with THP and excess amine solvent. In another process for the preparation of THP, the reaction of one equivalent of base and THPC has been carried out in the presence of an alkali metal sulfite (I. Gordon and G. M. Wagner, U.S. Pat. 3,257,460, issued June 21, 1966). In this process, the THP must be extracted with a solvent from the salt formed in the neutralization of the THPC as well as from the bisulfite adduct of formaldehyde.

In a similar manner most of the methods reported for the preparation of THPO utilize the reaction of THPC with either a weak base, such as barium carbonate, at elevated temperature, or an excess of a strong base, such as sodium hydroxide, at room temperature [A. Hoffman, J. Amer. Chem. Soc., 52, 2995 (1930)]. An added alkali metal sulfite has been used in another method (I. Gordon, U.S. Pat. 3,076,034, issued Jan. 29, 1963) to remove the byproduct formaldehyde as is done in the similar method for the preparation of THP. In all of these methods, it will be noted that extraction of the water-soluble THPO from the various water-soluble byproducts is required. That the purity of the THPO affects the efficiency of its subsequent use as an intermediate has been amply shown in yet another process (W. C. Hammann and R. B. Clampitt, U.S. Pat. 3,242,217, issued Mar. 22, 1966). In the latter process, THPC is treated with aqueous barium carbonate (to effect conversion of THPC to THPO) and the resulting solution is treated consecutively with cation and anion exchange resins to remove ionic impurities. As shown by $^{31}P$ nuclear magnetic resonance (NMR) spectra, the isolated product exhibits only the $^{31}P$ NMR signal expected for THPO. When the ion exchange resins are not used (especially the anion exchange resin), the product contains other phosphorus species that make further use of the product as a starting material for its esters very difficult.

We have now found a novel method by which either THP or THPO may be produced, according to the experimental conditions selected, from a tetrakis(hydroxymethyl)phosphonium salt, such as THPC, and a strongly basic anion exchange resin. It should be noted that in the present invention the basic anion exchange resin itself serves to convert THPC to THP or THPO and does not serve merely to remove anionic impurities, as in the case of the process of Hammann and Clampitt. Further, this novel method has the advantage over prior methods in that ionic byproducts formed in the present process are readily removed from the product THP or THPO without troublesome solvent extractions. The process of this invention has the further advantage that either water or nonaqueous materials may be used as solvents, as long as the phosphonium salt and product THP or THPO are soluble in the chosen solvent.

It was found by titration of THPC with sodium hydroxide in water and in methanol that the equivalence point (corresponding to 1:1 stoichiometry) occurred at about pH 8.5 in water and at a value of 7.3 in methanol. By the process of this invention a solution of a tetrakis(hydroxymethyl)phosphonium salt, $$[(HOCH_2)_4P]_n^+X^{-n},$$

wherein X is an anion such as, for example, chloride, bromide, acetate, phosphate, and the like, and $n$ is the valence of the anion, is treated in a suitable solvent with a strongly basic anion exchange resin in the hydroxide form until the pH of the solution reaches that value determined as the equivalence point in the solvent used. Thus, slow addition of a strongly basic anion exchange resin in the hydroxide form to an aqueous solution of THPC under an inert atmosphere until the pH of the solution is about 8.5 (one mole of resin reacted per mole of THPC) results in the formation of substantially pure THP. In theory, at least, the reaction may be written as follows:

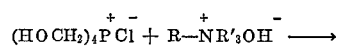

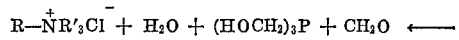

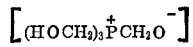

where

represents the cation of the ion exchange resin. In effect, the reaction is one in which the THPC is neutralized by the basic resin, which is itself converted to its chloride form. The presumed intermediate betaine (shown in brackets) decomposes to THP and formaldehyde. The aqueous solution is then filtered or decanted from the resin and the latter is washed with water to remove adsorbed solution. Finally, water and most of the formaldehyde are removed from the resulting solution under vacuum and the product is substantially pure THP, as indicated by its $^1$H and $^{31}$P nmr spectra. The 60 MHz. proton spectrum in $D_2O$ contained a doublet for the $PCH_2$ protons of THP at 4.15 p.p.m., $J_{PCH}=5.5$ Hz., $J_{13CH}\sim148$ Hz. (DSS internal standard), and very weak signals from impurities at 3.67 and 4.83 p.p.m. The 40.5 MHz. phosphorus spectrum in $D_2O$ contained five of the seven expected lines (the two weakest lines are lost in the noise) for the phosphorus in THP at +24.5 p.p.m. (external 85% $H_3PO_4$ reference) with an approximate value for $J_{PCH}$ of 5 Hz.; a trace of THPO was indicated by a weak signal at −49.0 p.p.m. The supercooled liquid residue after solvent removal was cooled to −30° and gave a waxy solid, with an elemental analysis in accord with theory. The mass spectrum run at 70 ev. gave no significant peaks above the molecular ion peak at m/e 124.

In a similar manner THPO may be prepared directly from the reaction of THPC and a strongly basic anion exchange resin. The procedure used is the same as that used for the preparation of THP except that an excess of the basic resin is required to react with THPC. The amount of the excess is unimportant, although it will determine the rate at which the product THPO is formed. Due care should be observed, however, since one mole of hydrogen is also liberated per mole of THPO formed. THPO prepared by previously published methods is usually difficult to purify. The product obtained by the present process is, however, readily recrystallized from absolute ethanol and yields a crystalline, hygroscopic solid. The $^1$H NMR spectrum in $D_2O$ indicates a doublet for the $PCH_2$ protons at 4.20 p.p.m., $J_{PCH}=3.1$ Hz., $J_{13CH}\sim146$ Hz. It is also possible to treat THP itself with a strongly basic anion exchange resin in the hydroxide form to convert the phosphine to its oxide.

Anion exchange resins useful in the practice of this invention are those classified as strongly basic resins of the quaternary ammonium type (see, for example, "Ion Exchange," F. Helfferich, McGraw-Hill Book Co., Inc., New York, 1962). These resins are polymers of styrene to which are attached quaternary ammonium groups such as

Divinyl benzene is used for crosslinking. Thus, Dowex-1 X 8 resin (made by Dow Chemical Co.) contains the trimethylbenzyl-ammonium group and there is 8% divinylbenzene used to crosslink.

The weakly basic resins of the polyamine type are apparently too weakly basic to bring about the desired transformation and contain amino groups which may actually react with THPC in such a manner that the phosphorus becomes part of the resin structure.

Although in the process of this invention the ion exchange resin may be employed in a column, it is generally preferred to operate by means of a batch process. In a column operation in which, for exchange, a THPC solution is passed through a column containing the resin, the effluent is generally found to contain at least some THPO, which results from the fact that the resin is present in excess and converts some product THP to THPO. The generation of hydrogen and consequent channeling in the column is also a problem in this type of operation. Although other types of operation may be possible, the batch method is preferred. In this type of operation only a small part of the total available capacity of the resin employed actually enters the reaction, necessitating the use of a large excess of resin over the calculated stoichiometric amount. This is of little consequence, however, since the resin is readily regenerated with sodium hydroxide and may be reused.

Although THP may be formed from THPC and a strongly basic anion exchange resin below or above ambient temperature, it is generally convenient and preferred to operate at about ambient temperature. At lower temperatures the reaction may proceed more slowly than desired, and at higher temperatures there is the risk that with increased reaction rates some THP may be converted to THPO. Likewise, in the conversion of THPC to THPO, higher temperatures should be avoided, since THPC and strong bases react to form bis(hydroxymethyl)phosphinic acid at elevated temperatures.

In U.S. Pat. 3,243,450, issued Mar. 29, 1966, it is disclosed that THP and various substituted hydroxymethylphosphines prepared from THP afford protection against misfiring and surface ignition when used as gasoline additives. In U.S. Pat. 3,030,421 issued Apr. 17, 1962, it is further disclosed that THP is useful as a flameproofing agent for wood and textiles. THPO is useful as an intermediate in the preparation of its trialkanoyl derivatives. In U.S. Pat. 3,242,217 it is disclosed that the trialkanoates of THPO are useful as plasticizers and flame-proofing agents for various plastics. They are also useful as lubricants, hydraulic fluids, and heat-transfer agents.

In the following examples, temperatures are given in degrees Centigrade.

EXAMPLE 1

To a solution of 25.0 g. (0.131 mole) of THPC in 100 ml. of distilled water contained in a flask fitted with a mechanical stirrer, nitrogen flush, and a combination pH electrode attached to a pH meter, was added over about 45 min. about 150 ml. (0.21 equiv.) of 20–50 mesh Dowex-1 X 8 resin in the hydroxide form. Addition of resin was stopped when the pH of the solution was 8.5. After filtering the resin, it was washed portionwise with 150 ml. of distilled water. The filtrate was concentrated on a rotary evaporator at 65–70° under aspirator vacuum and finally under high vacuum for about 30 min. The supercooled liquid weighed 13.0 g. (80%), $n^{20}D$ 1.5497. Its neat infrared spectrum between sodium chloride plates showed no band at 1052 cm.$^{-1}$ due to THPC, nor bands at 1043 or 1135 cm.$^{-1}$ due to THPO, but there was present a broad, intense band at 1010 cm.$^{-1}$ due to THP. On further evacuation and cooling at −30°, the viscous liquid solidified to a waxy solid. The chemical shift of the $CH_2$ protons in $D_2O$ was 4.15 p.p.m., $J_{PCH}=5.5$ Hz., $J_{13CH}\sim148$ Hz. Small impurity peaks were present at 3.67 and 4.83 p.p.m.

Anal.—Calcd. for $C_3H_9O_3P$: C, 29.04; H, 7.31; P, 24.96; mol. wt., 124. Found: C, 28.92; H, 7.46; P, 24.79; mol. wt., 130 (osmometric in ethanol).

EXAMPLE 2

The procedure was the same as that given in Example 1 except that methanol was the solvent and the resin was added until the value recorded by the pH meter was 7.3. The product THP gave essentially the same proton NMR spectrum as the product of Example 1.

EXAMPLE 3

To a slurry of 200 ml. (0.300 equiv.) of Dowex-1 X 10 resin in the hydroxide form in 50 ml. of distilled water contained in a beaker was added slowly and with good stirring a solution of 25.0 g. (0.131 mole) of THPC in 50 ml. of distilled water. The vigorous gas evolution subsided slowly as the slurry was stirred for about 17 hrs. before filtering. The resin was washed with three 50 ml. portions of distilled water and the solution was evaporated at 70–80° in vacuo to yield 16.1 g. (88%) of a light yellow oil. The THPO was recrystallized from absolute ethanol and yielded colorless crystals after cooling to −30°, m.p. 50–52°. Its infrared spectrum in water contained strong bands at 1043 and 1134 cm.$^{-1}$ and the chemical shift of the CH$_2$ protons in D$_2$O was 4.20 p.p.m., $J_{PCH}=3.1$ Hz.; $J_{13CH}\sim146$ Hz.

*Anal.*—Calcd. for C$_3$H$_9$O$_4$P: C, 25.72; H, 6.48; P, 22.11; mol. wt., 140. Found: C, 25.62; H, 6.52; P, 22.13; mol. wt., 150 (osmometric in ethanol).

We claim:

1. The process of preparing tris(hydroxymethyl)phosphine, which process comprises:
   (a) adding the hydroxide form of a strongly basic anion-exchange resin, selected from the class of resins in which benzyl trimethylammonium groups are incorporated into a styrene-divinylbenzene copolymer matrix, to an aqueous solution of tetrakis(hydroxymethyl)phosphonium chloride at about room temperature until the pH is about 8.5;
   (b) removing the resin added in (a); and
   (c) removing the water and byproduct formaldehyde from the solution of step (b).

2. The process of preparing tris(hydroxymethyl)phosphine, which process comprises:
   (a) adding the hydroxide form of a strongly basic anion exchange resin, selected from the class of resins in which benzyl trimethylammonium groups are incorporated into a styrene-divinylbenzene copolymer matrix, to a methanol solution of tetrakis(hydroxymethyl)phosphonium chloride at about room temperature until a pH meter indicates a value of 7.3 for the solution;
   (b) removing the resin added in (a); and
   (c) removing the methanol and byproduct formaldehyde from the solution of step (b).

3. The process of preparing tris(hydroxymethyl)phosphine oxide, which process comprises:
   (a) reacting an excess of the hydroxide form of a strongly basic anion exchange resin, selected from the class of resins in which benzyl trimethylammonium groups are incorporated into a styrene-divinylbenzene copolymer matrix, with an aqueous solution of tetrakis(hydroxymethyl)phosphonium chloride until the evolution of hydrogen ceases;
   (b) removing the resin added in (a); and
   (c) removing the water and byproduct formaldehyde from the solution of step (b).

References Cited

UNITED STATES PATENTS

| | | | |
|---|---|---|---|
| 3,677,956 | 7/1972 | Carlson | 260—606.5 P X |
| 3,729,516 | 4/1973 | Stockel et al. | 260—606.5 P |
| 3,242,217 | 3/1966 | Hammann et al. | 260—606.5 P |
| 3,636,160 | 1/1972 | Carlson | 260—606.5 P |
| 3,100,799 | 8/1963 | Rauhut et al. | 260—606.5 P |
| 3,030,421 | 4/1962 | Reuter et al. | 260—606.5 P |
| 3,660,495 | 5/1972 | Lin | 260—606.5 P |
| 3,704,325 | 11/1972 | Stockel et al. | 260—606.5 P |

P. F. SHAVER, Assistant Examiner

DANIEL E. WYMAN, Primary Examiner